US009892591B2

(12) United States Patent
Smith

(10) Patent No.: US 9,892,591 B2

(45) Date of Patent: Feb. 13, 2018

(54) WAGERING GAME WITH OVERRIDE AWARD WHEN THRESHOLD IS EXCEEDED

(71) Applicant: Bally Gaming, Inc., Las Vegas, NV (US)

(72) Inventor: Pamela S. Smith, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 18 days.

(21) Appl. No.: 15/249,607

(22) Filed: Aug. 29, 2016

(65) Prior Publication Data

US 2016/0371925 A1 Dec. 22, 2016

Related U.S. Application Data

(63) Continuation of application No. 14/219,611, filed on Mar. 19, 2014, now Pat. No. 9,449,455.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ...... *G07F 17/3244* (2013.01); *G07F 17/3209* (2013.01); *G07F 17/3213* (2013.01); *G07F 17/3225* (2013.01); *G07F 17/34* (2013.01)

(58) Field of Classification Search

CPC ............. G07F 17/3244; G07F 17/3258; G07F 17/3262; G07F 17/3267

USPC ............................................... 463/16, 20, 25

See application file for complete search history.

(56) References Cited

U.S. PATENT DOCUMENTS

| | | | |
|---|---|---|---|
| 6,517,433 | B2 | 2/2003 | Loose et al. |
| 7,704,137 | B2 | 4/2010 | Englman |
| 7,749,073 | B2 | 7/2010 | Thomas et al. |
| 7,753,769 | B2 | 7/2010 | Gomez et al. |
| 7,819,737 | B2 | 10/2010 | Englman et al. |
| 8,157,641 | B2 | 4/2012 | Englman et al. |
| 8,187,079 | B2 | 5/2012 | Gomez et al. |
| 8,622,811 | B1 | 1/2014 | Aoki et al. |
| 2004/0023710 | A1 | 2/2004 | McGahn et al. |
| 2004/0152507 | A1 | 8/2004 | Baerlocher et al. |
| 2005/0101375 | A1 | 5/2005 | Webb et al. |
| 2008/0182657 | A1 | 7/2008 | Bennett et al. |
| 2009/0247277 | A1 | 10/2009 | Caspers et al. |
| 2010/0069160 | A1 | 3/2010 | Barrett et al. |
| 2010/0120504 | A1 | 5/2010 | Larsen |
| 2010/0234099 | A1 | 9/2010 | Rasmussen et al. |

(Continued)

*Primary Examiner* — James S McClellan

(74) *Attorney, Agent, or Firm* — Nixon Peabody LLP

(57) ABSTRACT

A gaming method of conducting a wagering game includes receiving, via one or more input devices, an input indicative of a wager, displaying, via one or more display devices, a plurality of symbols to indicate a randomly selected outcome of a wagering game in a display area, and determining, via at least one of one or more processors, one or more award amounts for the randomly selected outcome. The one or more award amounts are based on the wager and the symbols of the randomly selected outcome. The method further includes determining an aggregate award amount based on the one or more award amounts, comparing the aggregate award amount to a predetermined threshold amount, awarding the aggregate award amount if the aggregate award amount is less than the predetermined threshold amount, and awarding an override-award amount if the aggregate award amount is greater than the predetermined threshold amount.

20 Claims, 12 Drawing Sheets

(56) References Cited

U.S. PATENT DOCUMENTS

| | | | |
|---|---|---|---|
| 2011/0053676 | A1 | 3/2011 | Wolf et al. |
| 2014/0179396 | A1 | 6/2014 | Aoki et al. |
| 2015/0269809 | A1 | 9/2015 | Smith et al. |

WAGERING GAME WITH OVERRIDE AWARD WHEN THRESHOLD IS EXCEEDED

CROSS-REFERENCES TO RELATED APPLICATIONS

This application is a continuation of U.S. application Ser. No. 14/219,611, filed Mar. 19, 2014, which is related to U.S. patent application Ser. No. 13/760,229, titled "Wagering Game Employing A Threshold-Based Game Enhancement" and filed on Feb. 6, 2013 and U.S. patent application Ser. No. 13/775,505, titled "Wagering Game With A Guaranteed But Variable Bonus Payout" and filed on Feb. 25, 2013, each of which are hereby incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a wagering game employing a threshold-based override award.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to one aspect of the invention, a computer-implemented method in a gaming system having game-logic circuitry including one or more central processing units and one or more memory devices is described. The method includes receiving, via one or more input devices, an input indicative of a wager, displaying, via one or more display devices, a plurality of symbols to indicate a randomly selected outcome of a wagering game in a display area, and determining, via at least one of one or more processors, one or more award amounts for the randomly selected outcome. The one or more award amounts are based on the wager and the symbols of the randomly selected outcome. The method further includes determining, via at least one of the one or more processors, an aggregate award amount based on the one or more award amounts, comparing, via at least one of the one or more processors, the aggregate award amount to a predetermined threshold amount, awarding the aggregate award amount if the aggregate award amount is less than the predetermined threshold amount, and awarding an override-award amount if the aggregate award amount is greater than the predetermined threshold amount.

According to another aspect of the invention, a gaming system includes one or more input devices, one or more display devices, and game-logic circuitry. The game-logic circuitry includes one or more central processing units and one or more memory devices. The one or more memory devices store instructions that, when executed by the one or more central processing units, cause the game-logic circuitry to receive, via at least one of the one or more input devices, an input indicative of a wager, display, via at least one of the one or more display devices, a randomly selected outcome of a wagering game, evaluate the randomly selected outcome to determine one or more award amounts, aggregate the one or more award amounts to determine an aggregate award amount, and determine whether the aggregate award amount is greater than a predetermined threshold amount. If the aggregate award amount is determined to be greater than the predetermined threshold amount, the instructions further cause the game-logic circuitry to the award an override-award amount. If the aggregate award amount is determined to be less than the predetermined threshold amount, the instructions further cause the game-logic circuitry to award the aggregate award amount.

According to yet another aspect of the invention, a computer-implemented method in a gaming system having game-logic circuitry including one or more central processing units and one or more memory devices is described. The method includes receiving, via one or more input devices, an input indicative of a wager, displaying, via one or more display devices, a plurality of symbols to indicate a randomly selected outcome of a wagering game in a display area, and determining, via at least one of one or more processors, one or more award amounts for the randomly selected outcome. The one or more award amounts are based on the wager and the symbols of the randomly selected outcome. The method further includes determining, via at least one of the one or more processors, an aggregate award amount based on the one or more award amounts. The method also includes comparing, via at least one of the one or more processors, the aggregate award amount to one or more of a plurality of predetermined threshold amounts. Each of the plurality of predetermined threshold amounts is associated with a respective one of a plurality of override-award amounts. The method includes, if the aggregate award amount is not greater than at least one of the plurality of predetermined threshold amounts, awarding the aggregate amount and, if the aggregate award amount is greater than at least one of the plurality of predetermined threshold amounts, awarding the override-award amount associated with the greatest predetermined threshold amount that is less than the aggregate award amount.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
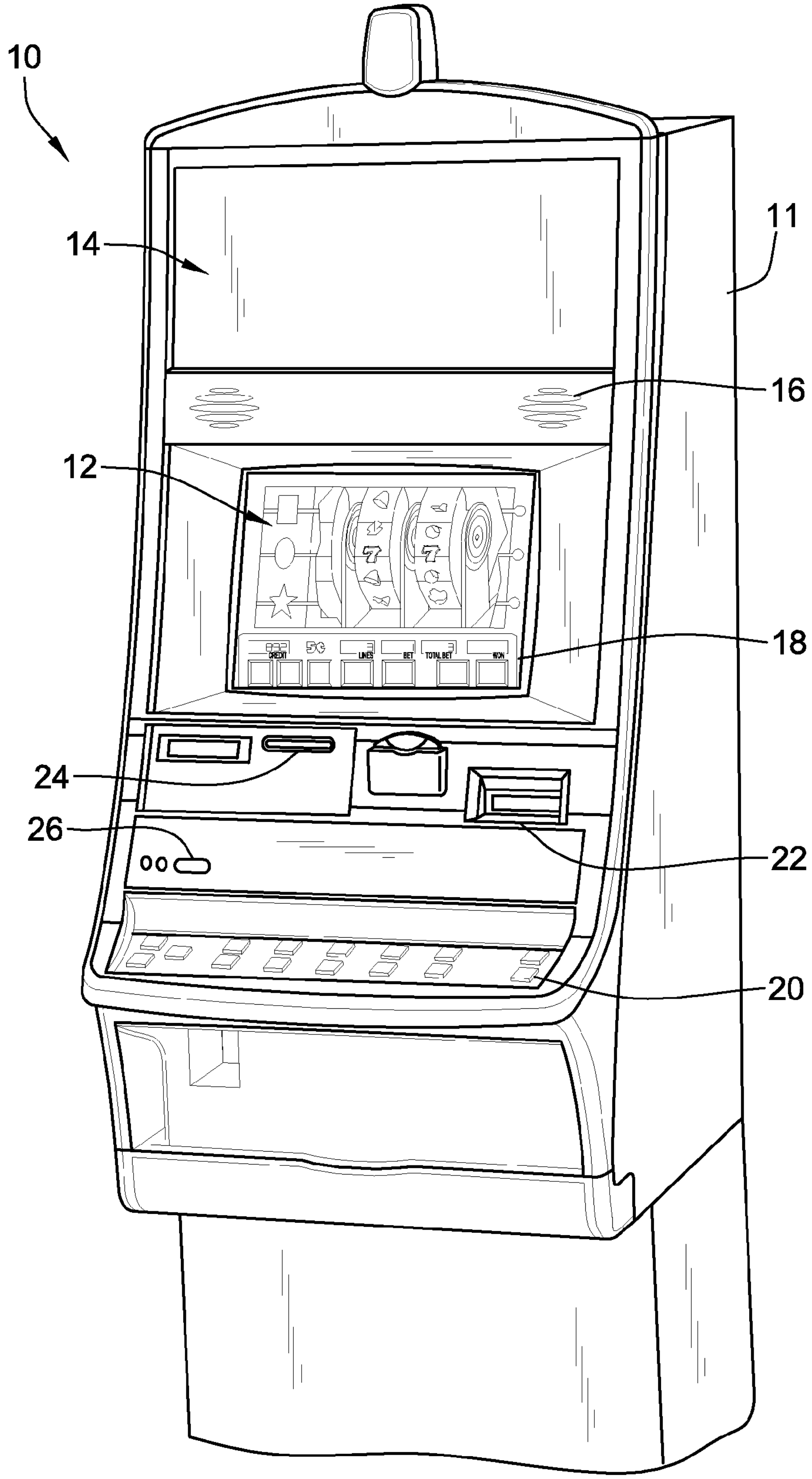
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering games,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those used in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in conducting wagering games, or may include non-dedicated devices, such as mobile phones, personal digital assistants, personal computers, etc. Exemplary types of gaming machines are disclosed in U.S. Pat. No. 6,517,433 and Patent Application Publication Nos. US2010/0069160 and US2010/0234099, which are incorporated herein by reference in their entireties.

The gaming machine 10 illustrated in FIG. 1 comprises a cabinet 11 that may house various input devices, output devices, and input/output devices. By way of example, the gaming machine 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a “Max Bet” button or soft key to indicate a player’s desire to place a maximum wager to play the wagering game). The input(s), once transformed into electronic data signals, are output to a game-logic circuitry for processing. The electronic data signals are selected from a group consisting essentially of an electrical current, an electrical voltage, an electrical charge, an optical signal, an optical element, a magnetic signal, and a magnetic element.

Figure 2:
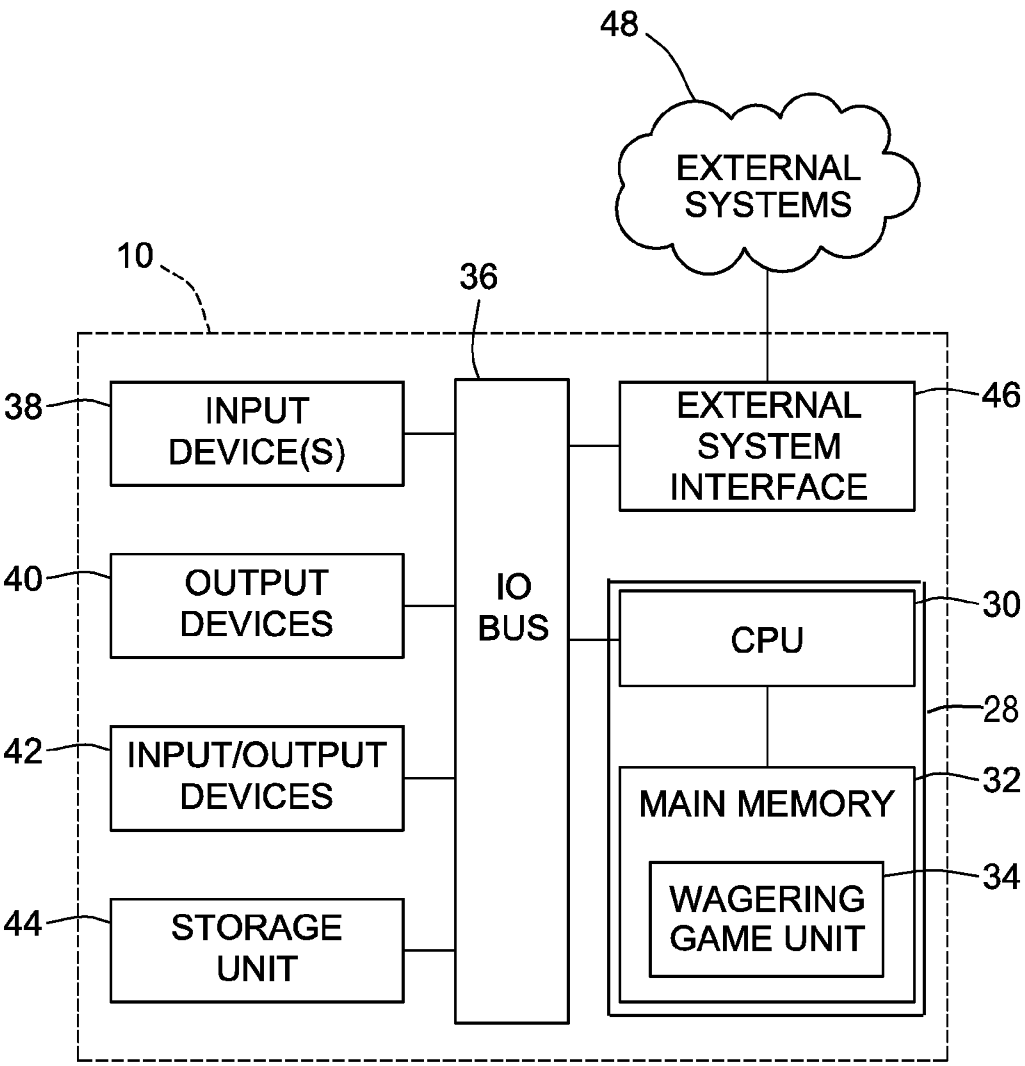
FIG. 2 (PRIOR ART)
FIG. 2 is a schematic view of a gaming system according to an embodiment of the present invention.

Turning now to FIG. 2, there is shown a block diagram of the gaming-machine architecture. The gaming machine 10 includes game-logic circuitry 28 having a central processing unit (CPU) 30 connected to a main memory 32. The CPU 30 may include any suitable processor(s), such as those made by Intel and AMD. By way of example, the CPU 30 may include a plurality of microprocessors including a master processor, a slave processor, and a secondary or parallel processor. Game-logic circuitry 28, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 28, and more specifically the CPU 30, comprises one or more controllers or processors and such one or more controllers or processors need not be disposed proximal to one another and may be located in different devices or in different locations. The game-logic circuitry 28, and more specifically the main memory 32, comprises one or more memory devices which need not be disposed proximal to one another and may be located in different devices or in different locations. The game-logic circuitry 28 is operable to execute all of the various gaming methods and other processes disclosed herein. The main memory 32 includes a wagering-game unit 34. In one embodiment, the wagering-game unit 34 may cause wagering games to be presented, such as video poker, video black jack, video slots, video lottery, etc., in whole or part.

The game-logic circuitry 28 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to a storage unit 44 and an external-system interface 46, which may be connected to external system(s) 48 (e.g., wagering-game networks).

The external system 48 includes, in various aspects, a gaming network, other gaming machines or terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external-system interface 46 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 48 such that the gaming machine 10 operates as a thin, thick, or intermediate client. The game-logic circuitry 28—whether located within ("thick client"), external to ("thin client"), or distributed both within and external to ("intermediate client") the gaming machine 10—is utilized to provide a wagering game on the gaming machine 10. In general, the main memory 32 (comprising one or more memory devices) stores programming for an RNG, game-outcome logic, and game assets (e.g., art, sound, etc.). When a wagering-game instance is executed, the CPU 30 (comprising one or more processors or controllers) executes the RNG programming to generate one or more pseudo-random numbers. The pseudo-random numbers are utilized by the CPU 30 when executing the game-outcome logic to determine a resultant outcome for that instance of the wagering game. The resultant outcome is then presented to a player of the gaming machine 10 by accessing the associated game assets, required for the resultant outcome, from the main memory 32. The CPU 30 causes the game assets to be presented to the player as outputs from the gaming machine 10 (e.g., audio and video presentations).

The gaming machine 10 may include additional peripheral devices or more than one of each component shown in FIG. 2. Any component of the gaming-machine architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
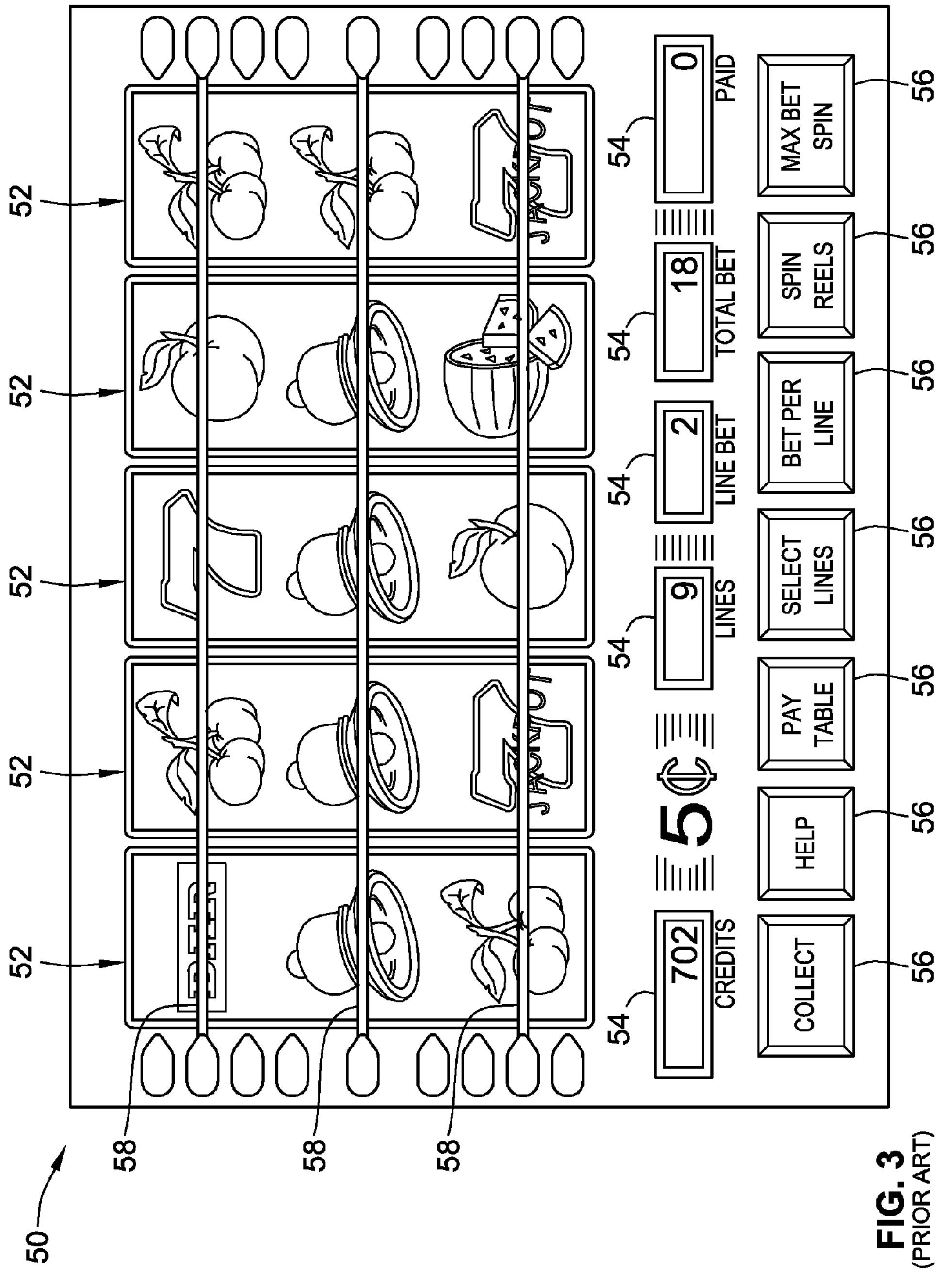
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The game-logic circuitry 28 operates to execute a wagering-game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 12 or secondary display 14) through the display of information such as, but not limited to, text, graphics, static images, moving images, etc., or any combination thereof. In accord with the method of conducting the wagering game, the game-logic circuitry 28 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 28 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 30 causes the recording of a digital representation of the wager in one or more storage media (e.g., storage unit 44), the CPU 30, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU 30 (e.g., the wager in the present example). As another example, the CPU 30 further, in accord with the execution of the stored instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 28 to determine the outcome of the wagering-game instance. In at least some aspects, the game-logic circuitry is configured to determine an outcome of the wagering-game instance at least partially in response to the random parameter.

Referring now to FIGS. 4-10, a wagering game with a threshold-based override award will be described. In such wagering games, when a player achieves an outcome-award amount that is greater than a threshold amount, an override-award amount is awarded to the player. The threshold amount is a fixed and predetermined amount of credits or currency for all plays of the wagering game. The override-award amount is also a fixed and predetermined amount of amount of credits or currency, which is greater than the threshold amount. Accordingly, when a player achieves an outcome of the wagering game that provides an outcome-award amount that is greater than the threshold amount but less than the override-award amount, the player advantageously receives a supplemental award amount that increases the payout to the player for the outcome of the wagering game. The supplemental award amount is equal to the difference between the override-award amount and the outcome-award amount achieved from the outcome of the wagering game.

Figure 4:
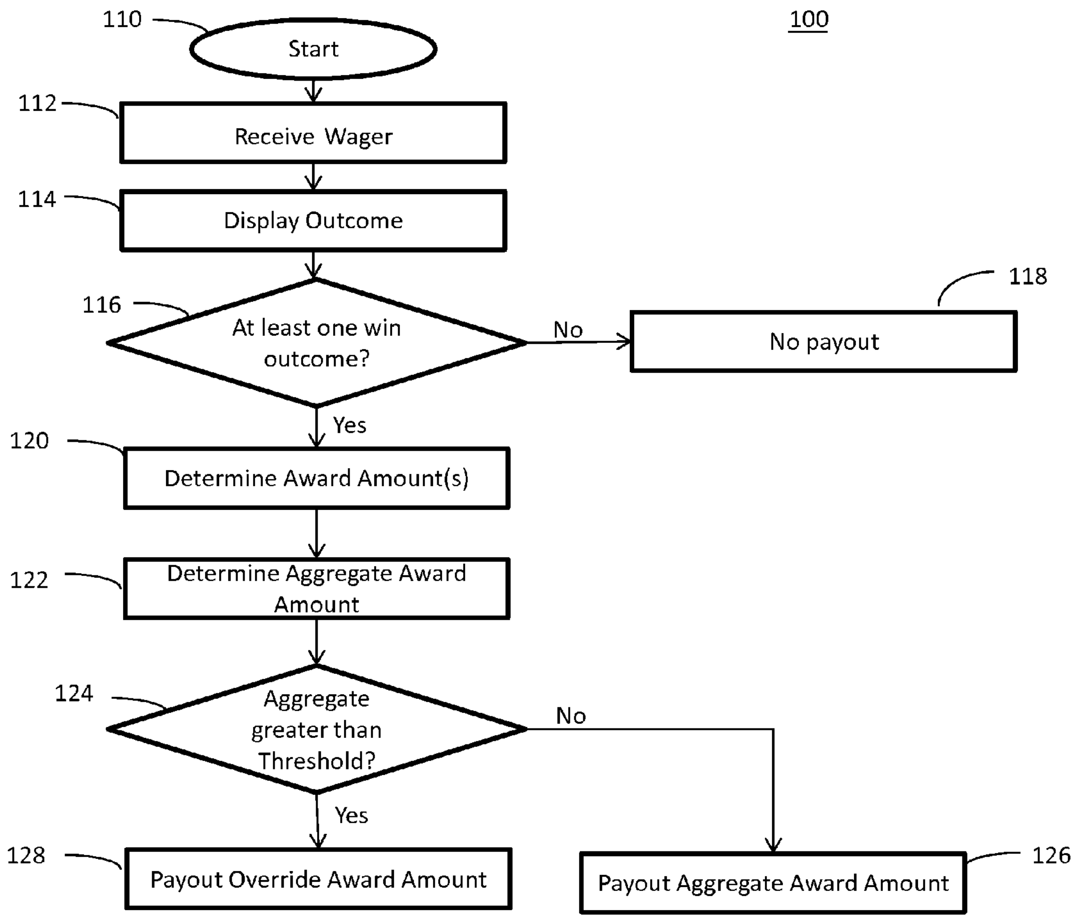
FIG. 4 is a flowchart for an exemplary algorithm that corresponds to instructions executed by a controller in accord with at least some aspects of the disclosed concepts.

FIG. 4 is a flowchart of an exemplary algorithm 100 for conducting a play of a wagering game with a threshold-based override award according to some aspects of the present concepts. At step 110, the algorithm 100 is initiated. At step 112, an input indicative of a wager is received via one or more of the input devices (e.g., the touch screen 18, the buttons 20, etc.). At step 114, a randomly selected outcome for the wagering game is displayed via one or more of the output devices (e.g., the primary display area 12, the secondary display area 14, etc.). At step 116, the randomly selected outcome is evaluated (e.g., via the CPU 30) to determine whether the randomly selected outcome includes at least one winning outcome. If it is determined, at step 116, that the randomly selected outcome does not include at least one winning outcome, then no payout is awarded to the player and the algorithm 100 terminates at step 118.

If it is determined at step 116 that the randomly selected outcome includes at least one winning outcome, then an award amount is respectively determined for each winning outcome of the randomly selected outcome at step 120. For example, as described above with respect to FIG. 3, the award amount(s) can be determined based on a player's received wager in accordance with a pay table (e.g., a line pay combination on an activated payline and/or a scatter pay).

At step 122, the award amount(s) determined at step 120 are aggregated to determine an aggregate award amount (i.e., the outcome-award amount). At step 124, it is determined whether the aggregate award amount is greater than the predetermined threshold amount. If it is determined at step 124 that the aggregate amount is not greater than the threshold amount, the aggregate award amount is awarded (e.g., credited, paid out, etc.) to the player at step 126. If it is determined at step 124 that the aggregate amount is greater than the threshold amount, the override-award amount is awarded to the player at step 128.

Figure 5A:
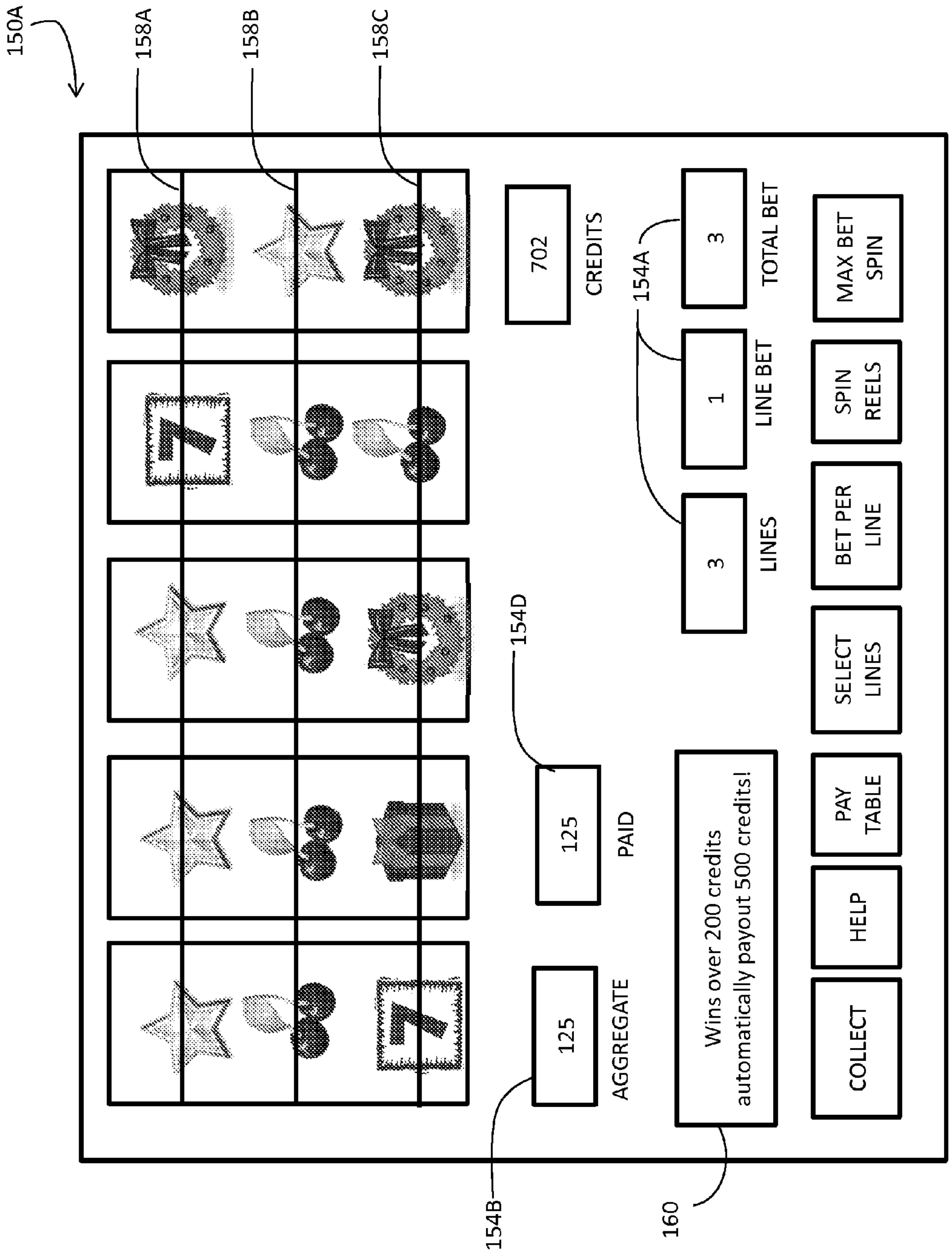
FIGS. 5A-5C are images of exemplary wagering game screens displayed on a gaming terminal, according to an embodiment of the present invention.
Figure 5B:
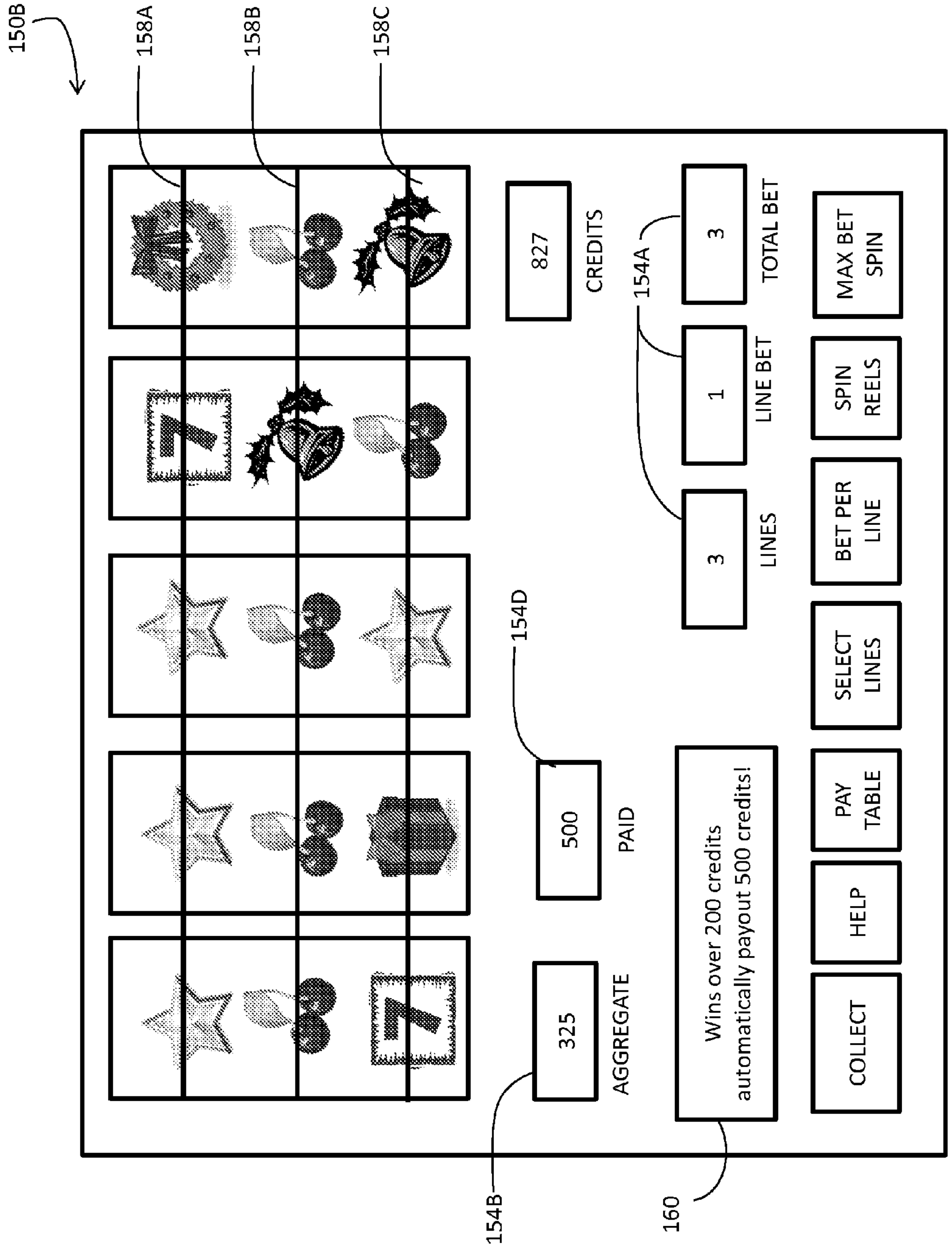
Figure 5C:
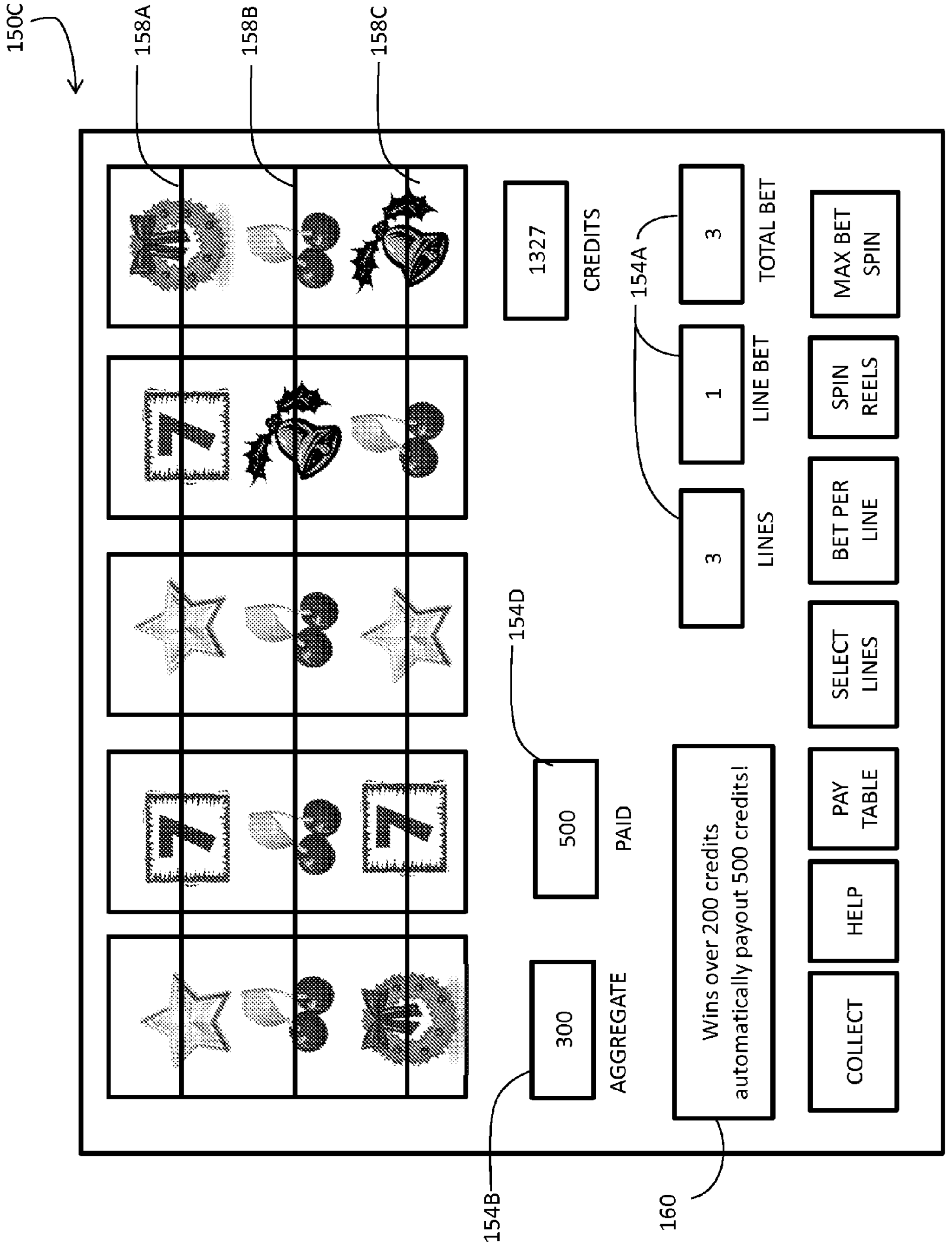

FIGS. 5A-5C illustrate non-limiting examples of wagering game screens 150A, 150B, 150C each displaying a randomly selected outcome for a different play of a wagering game employing a threshold-based override award. In the exemplary wagering game illustrated in FIGS. 5A-5C, the predetermined threshold amount is 200 credits and the predetermined override-award amount is 500 credits for all plays of the wagering game, as indicated in the displayed announcement indicator 160.

For a first play of the wagering game illustrated in FIG. 5A, the displayed credit meters 154A indicate that the player wagered one credit on three paylines 158A, 158B, 158C prior to the first play of the wagering game. The illustrated randomly selected outcome for the first play includes a first winning combination of symbols (e.g., three "star" symbols on the active payline 158A) that pays 25 credits and a second winning combination of symbols (i.e., four "cherry" symbols on the active payline 158B) that pays 100 credits based on the player's wager and the pay table (not shown). After summing the award amounts for the first winning combination and the second winning combination, the aggregate award amount of 125 credits is determined and displayed by a meter 154B. Because the aggregate amount of 125 credits is less than the threshold amount of 200 credits, the aggregate amount is provided to the player for the first play of the wagering game as indicated by the meter 154D.

For a second play of the wagering game illustrated in FIG. 5B, the displayed credit meters 154A indicate that the player again wagered one credit on three paylines 158A, 158B, 158C prior to the second play of the wagering game. The illustrated randomly selected outcome for the second play includes a first winning combination of symbols (e.g., three "star" symbols on the active payline 158A) that pays 25 credits, a second winning combination of symbols (i.e., four "cherry" symbols on the active payline 158B) that pays 100 credits, and a third winning combination of symbols (i.e., two "bell" scatter symbols) that pays 200 credits based on the player's wager and the pay table (not shown). Accordingly, the aggregate award amount for the second play of the wagering game is 325 credits as displayed by the meter 154B. Now, because the aggregate award amount of 325 credits is greater than the threshold amount of 200 credits, the override-award amount is provided to the player instead of the aggregate amount as indicated by the meter 154D. That is, the player is awarded a supplemental award of 175 credits for the second play of the wagering game.

For a third play of the wagering game illustrated in FIG. 5C, the displayed credit meters 154A indicate that the player again wagered one credit on three paylines 158A, 158B, 158C prior to the third play of the wagering game. The illustrated randomly selected outcome for the third play includes a first winning combination of symbols (i.e., four "cherry" symbols on the active payline 158B) that pays 100 credits and a second winning combination of symbols (i.e., two "bell" scatter symbols) that pays 200 credits based on the player's wager and the pay table (not shown). Accordingly, the aggregate award amount for the third play of the wagering game is 300 credits as displayed by a meter 154B. Again because the aggregate award amount of 300 credits is greater than the threshold amount of 200 credits, the override-award amount is provided to the player instead of the aggregate amount as indicated by the meter 154D. For the third play of the wagering game, the player is awarded a supplemental award of 200 credits. Accordingly, as illustrated in FIGS. 5B and 5C, while the override-award amount is fixed and predetermined (i.e., the override amount does not change), the supplemental award amount may vary depending on the outcome for the play of the wagering game.

According to some aspects of the present disclosure, the override-award amount is a maximum award amount that can be awarded for any single outcome of the wagering game. As one non-limiting example, the override-award amount can be the maximum amount that is legally permitted for a single play of the wagering game in a particular jurisdiction (e.g., at present, the State of Illinois legally limits the maximum payout to $500 for a single play of the wagering game). As another non-limiting example, the override-award amount can be set to the greatest award amount associated with any one line pay or scatter pay according to the pay table. However, it should be understood that, more generally, the override-award amount can be any amount that is greater than the threshold amount.

Figure 6:
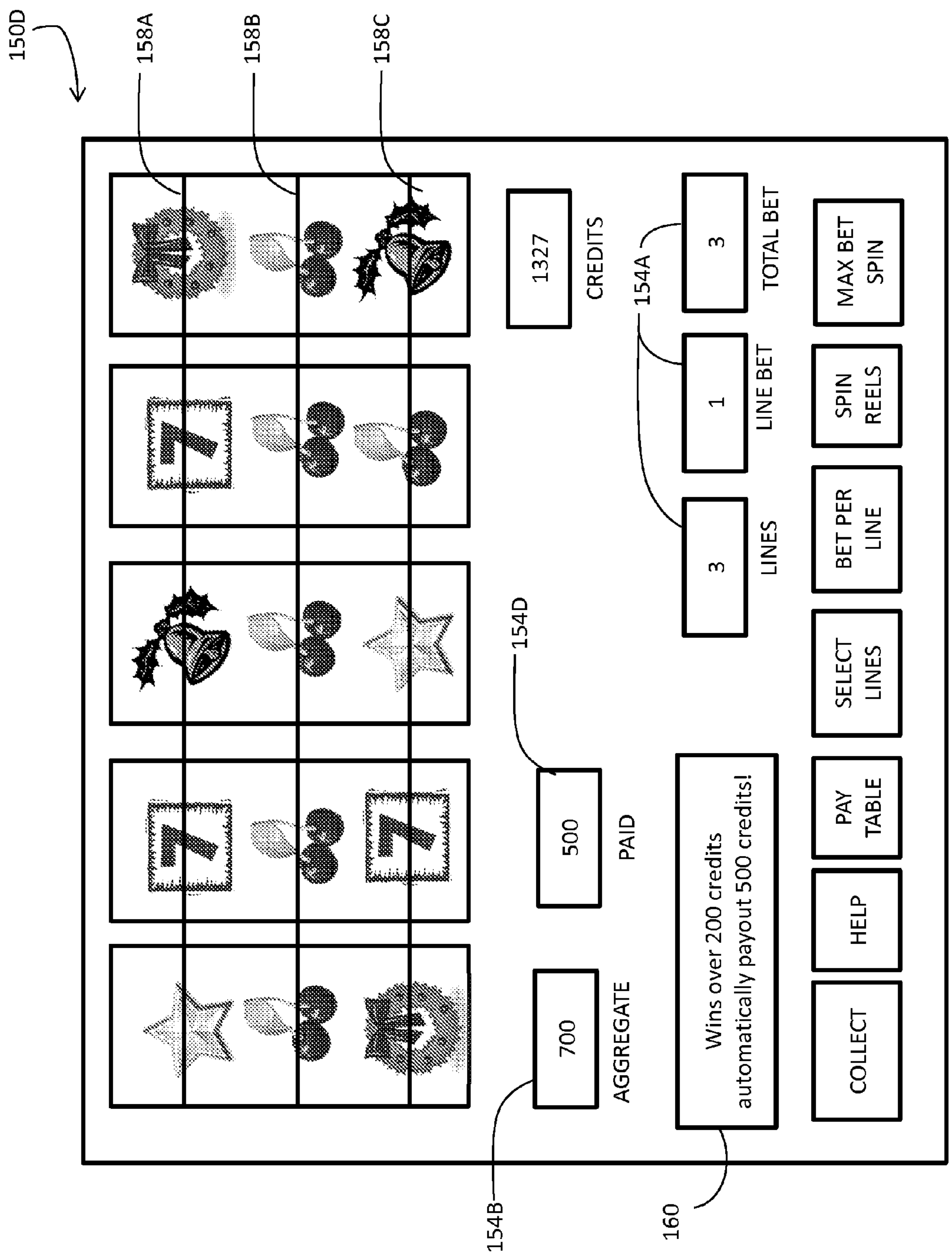
FIG. 6 is an image of an exemplary wagering game screen displayed on a gaming terminal, according to an embodiment of the present invention.
Figure 7:
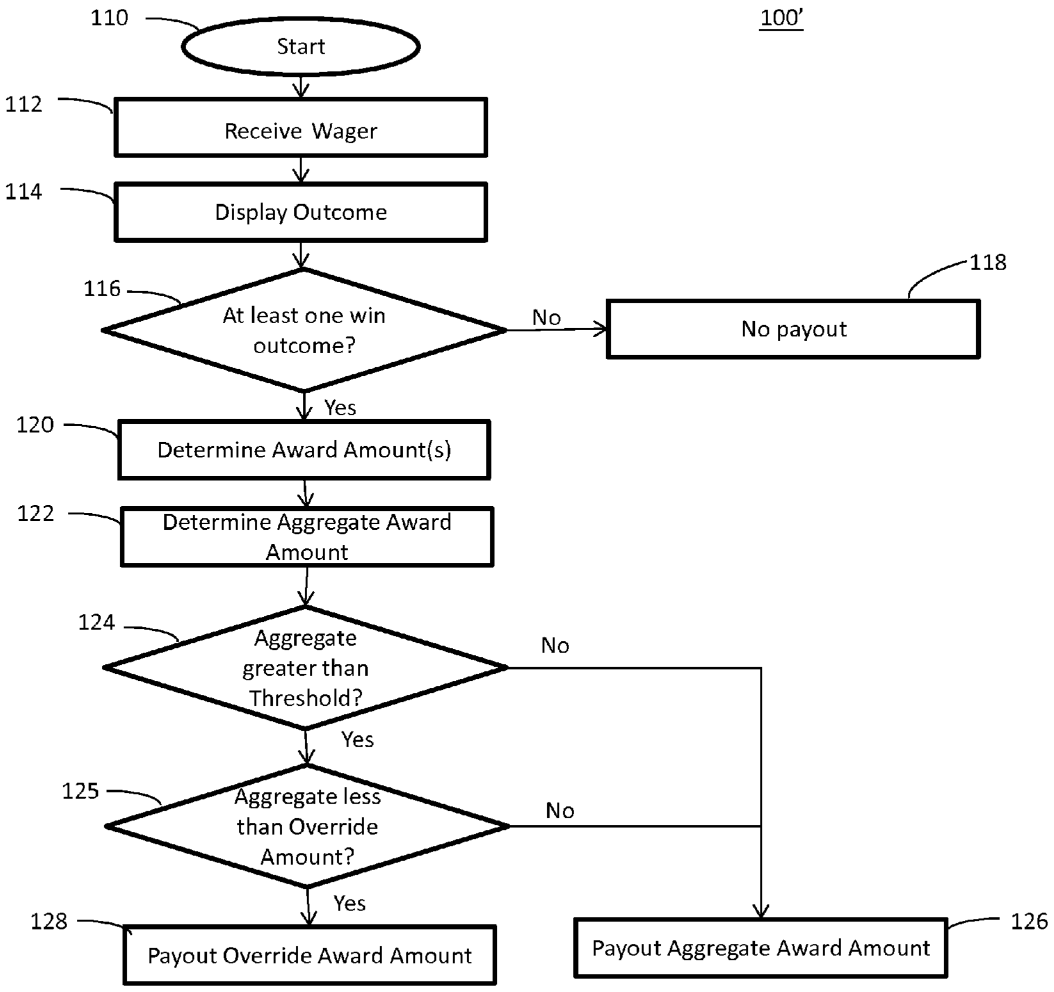
FIG. 7 is a flowchart for another exemplary algorithm that corresponds to instructions executed by a controller in accord with at least some aspects of the disclosed concepts.

In some embodiments, when the override-award amount is the maximum award amount for the wagering game, a player may receive less than the aggregate amount for an outcome of a play of the wagering game if the aggregate amount is greater than the override-award amount. For example, FIG. 6 illustrates an exemplary wagering game screen 150D displaying a randomly selected outcome for a fourth play of the wagering game illustrated and described above with respect to FIGS. 5A-5C. As shown in the announcement indicator 160, the predetermined threshold amount is 200 credits and the override-award amount is 500 credits. In FIG. 6, the illustrated randomly selected outcome for the play includes a first winning combination of symbols (i.e., five "cherry" symbols on the active payline 158B) that pays 500 credits and a second winning combination of symbols (i.e., two "bell" scatter symbols) that pays 200 credits based on the player's wager and the pay table (not shown). Accordingly, the aggregate award amount for the play of the wagering game is 700 credits as displayed by a meter 154B. As the aggregate award amount of 700 credits is greater than the threshold amount of 200 credits, the override-award amount of 500 credits is provided to the player instead of the aggregate amount as indicated by the meter 154D. As such, FIG. 6 illustrates an example of the wagering game having a threshold-based override award in which it is possible that the player will receive less than the aggregated award amount.

According to alternative aspects of the present disclosure, the wagering game can be configured such that the aggregate award amount is provided to the player if the aggregate award amount is greater than the override-award amount (i.e., the override-award amount may not be the maximum award amount for the wagering game). As a result, the override-award amount is provided if the aggregate award amount is greater than the threshold amount and less than the override-award amount. Otherwise, the aggregate award amount is provided to the player. In other words, the override-award amount is provided for a range of aggregate award amounts between the threshold amount and the override-award amount. To implement the wagering game according to such alternative aspects, the exemplary algorithm 100 illustrated and described above with respect to FIG. 4 can be modified to include an additional step 125 to determine whether the aggregate award amount is less than the override-award amount as shown FIG. 7. As shown in an exemplary algorithm 100' in FIG. 7, if it is determined at step 124 that the aggregate amount is not greater than the threshold amount, the aggregate award amount is awarded (e.g., credited, paid out, etc.) to the player at step 126. If it is determined at step 124 that the aggregate amount is greater than the threshold amount, it is determined whether the aggregate award amount is less than the override-award amount at step 125. If it is determined at step 125 that the aggregate amount is not less than the override-award amount, then the aggregate award amount is awarded to the player at step 126. On the other hand, if it is determined at step 125 that the aggregate award amount is less than the override-award amount, the override-award amount is awarded to the player at step 128.

In the examples illustrated in FIGS. 4-7, the wagering game includes a single override award associated with a single threshold amount. According to additional and/or alternative aspects of the present disclosure, the wagering game can include a plurality of override awards, each associated with respective threshold amount(s). As a non-limiting example, the aggregate award can be provided if it is less than a first threshold, a first override award can be provided if the aggregate award is between the first threshold amount and a second threshold amount, a second override award can be provided if the aggregate award is between the second threshold amount and a third threshold, and a third override award can be provided if the aggregate award is greater than the third threshold.

Figure 8:
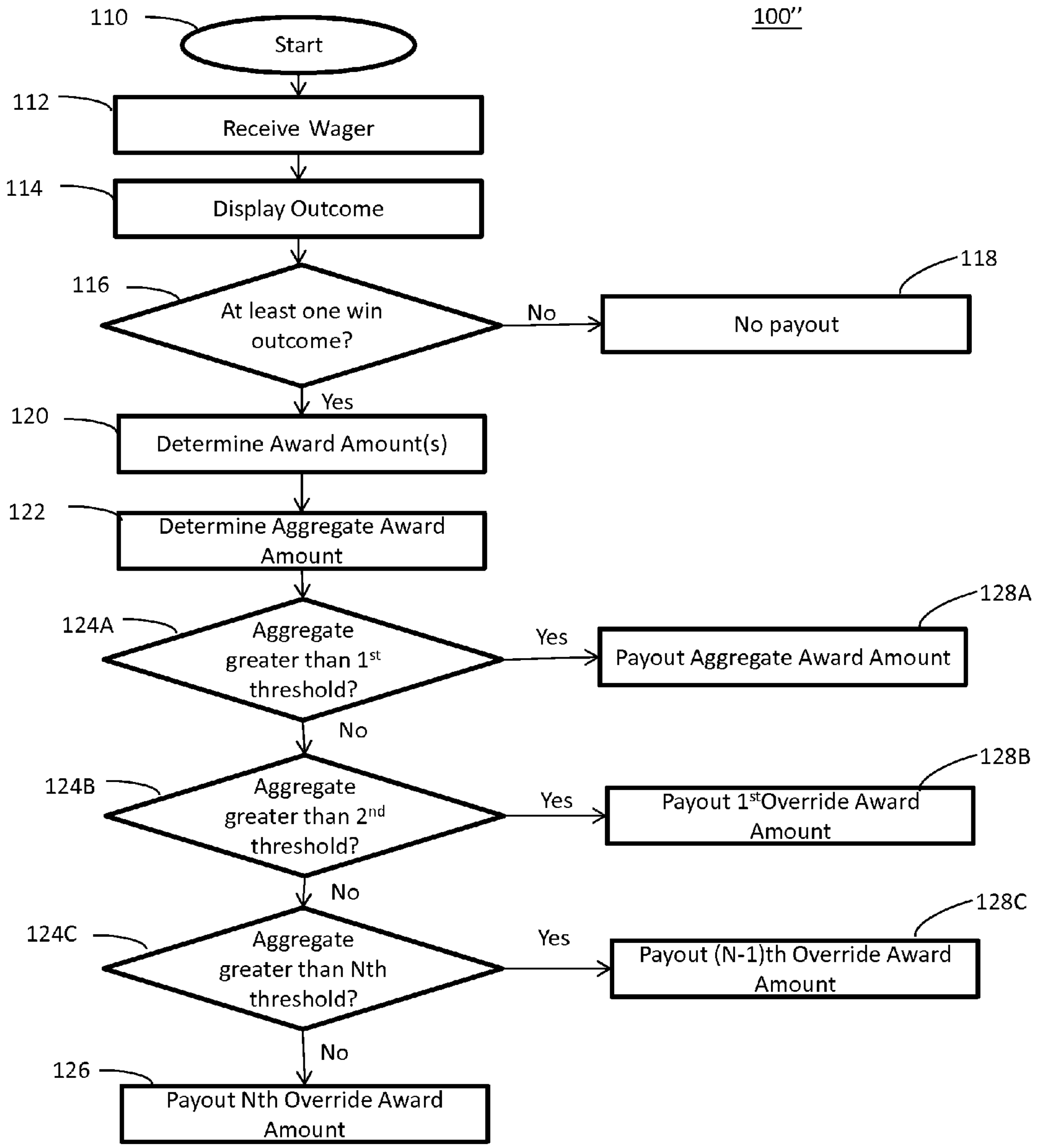
FIG. 8 is a flowchart for another exemplary algorithm that corresponds to instructions executed by a controller in accord with at least some aspects of the disclosed concepts.

FIG. 8 illustrates a flowchart of an exemplary algorithm 100" for implementing an example including N threshold amounts and associated override awards. As shown in FIG. 8, the algorithm 100" is substantially the same as the algorithm 100 of FIG. 1 up to step 122 at which the aggregate amount is determined. In the illustrated algorithm 100", it is determined whether the aggregate amount is greater than a first threshold amount at step 124A. If it is determined that the aggregate amount is not greater than the first threshold amount at step 124A, then the aggregate amount is provided to the player at step 128A. If it is determined that the aggregate amount is greater than the first threshold amount at step 124A, then it is determined whether the aggregate amount is greater than a second threshold amount at step 124B. If it is determined that the aggregate amount is not greater than the second threshold amount at step 124B, then a first override award is provided to the player at step 128B. If it is determined that the aggregate amount is greater than the second threshold amount at step 124B, then the algorithm 100" continues to evaluate one or more of the remaining threshold amounts in a similar manner. That is, if the aggregate amount is not greater than the next threshold amount (e.g., a third threshold amount), the override amount associated with the prior threshold amount (e.g., a second override amount associated with the second threshold amount) is provided to the player and, if the aggregate amount is greater than the next threshold amount, then the algorithm 100" continues to another threshold amount (e.g., a fourth threshold amount), and so on. If an override award has not been provided to the player after evaluating the first N-1 threshold amounts, the algorithm 100" eventually reaches step 124C at which it is determined whether the aggregate amount is greater than the Nth threshold amount. If it is determined that the aggregate amount is not greater than the Nth threshold amount at step 124C, then the (N−1)th override award, which is associated with the (N−1)th threshold amount, is provided to the player at step 128C. Otherwise, if it is determined that the aggregate amount is greater than the Nth threshold amount at step 124C, then the Nth override award, which is associated with the Nth threshold amount, is provided to the player at step 126. In this way, if the aggregate award amount is greater than the first threshold amount, the algorithm 100" provides to the player the override award associated with the greatest threshold amount that is less than the aggregate amount.

Figure 9:
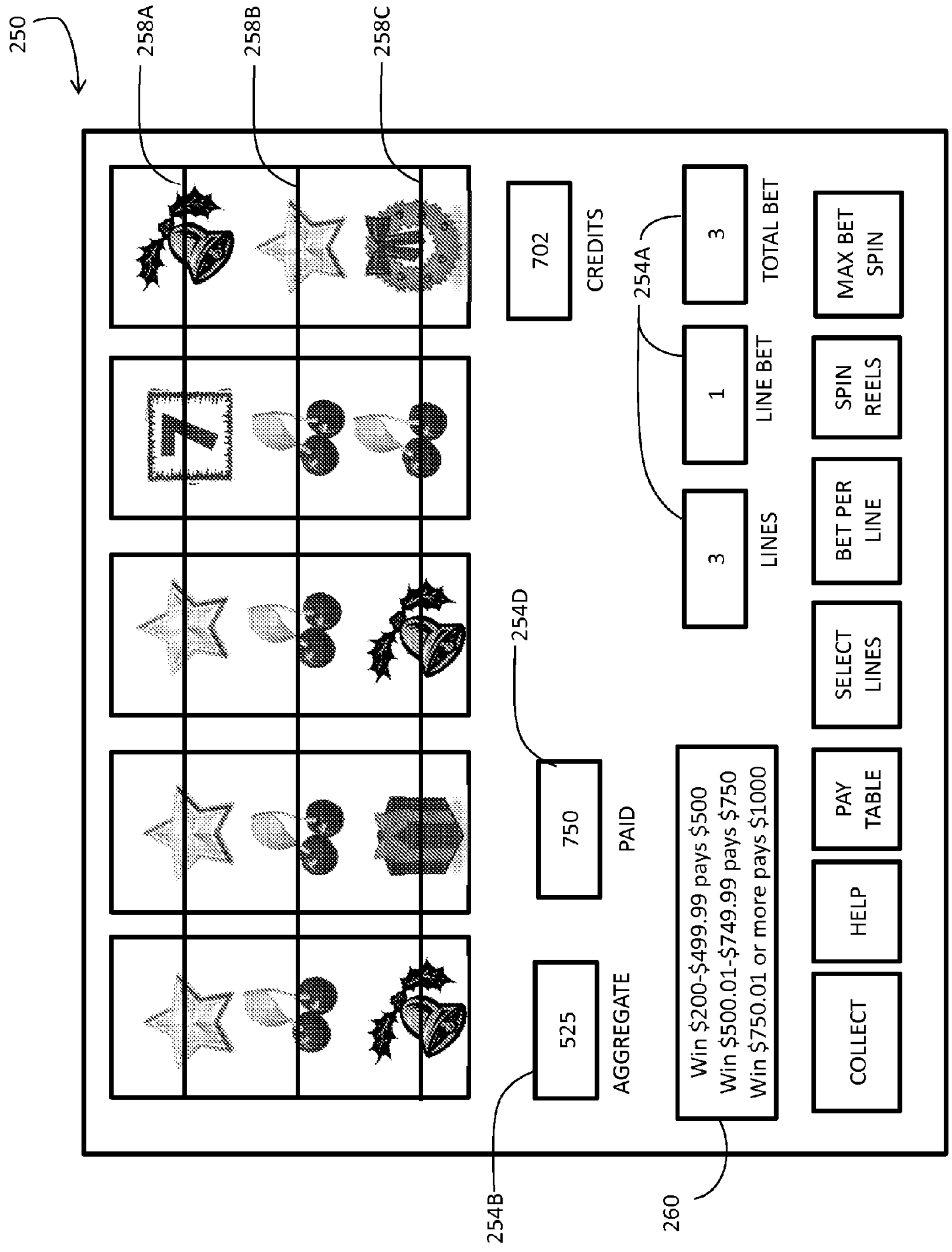
FIG. 9 is an image of an exemplary wagering game screen displayed on a gaming terminal, according to an embodiment of the present invention.

FIG. 9 illustrates an exemplary game screen 250 for the example wagering game algorithm 100" of FIG. 8. In the exemplary implementation illustrated in FIG. 9, the wagering game includes a first threshold amount of 200 credits, a second threshold amount of 500 credits, a third threshold amount of 750 credits, a first override-award amount of 500, a second override-award amount of 750, and a third override-award amount of 1000. As shown in FIG. 9, an announcement indicator 260 indicates that the first override-award amount of 500 credits is provided when the aggregate award amount is greater than the first threshold amount of 200 credits and less than the second threshold amount of 500 credits, the second override-award amount of 750 credits is provided when the aggregate amount is greater than the second threshold amount of 500 credits and less than the third threshold amount of 750 credits, and the third override-award amount of 1000 credits is provided when the aggregate amount is greater than the third threshold amount of 750 credits. Additionally, for the play of the wagering game illustrated in FIG. 9, the displayed credit meters 254A indicate that the player wagered one credit on three paylines 258A, 258B, 258C prior to the first play of the wagering game. The illustrated randomly selected outcome for the play includes a first winning combination of symbols (e.g., three “star” symbols on the active payline 158A) that pays 25 credits, a second winning combination of symbols (i.e., four “cherry” symbols on the active payline 158B) that pays 100 credits, and a third winning combination of symbols (i.e., three “bell” scatter symbols) that pays 400 credits based on the player’s wager and the pay table (not shown). After summing the award amounts for the first, second, and third winning combinations, the aggregate award amount of 525 credits is determined and displayed by a meter 254B. Because the aggregate amount of 525 credits falls within the range of amounts associated with the second override-award amount (i.e., greater than the second threshold amount and less than the third threshold amount), the second override-award amount of 750 credits is provided to the player for the play of the wagering game as indicated by the meter 254D.

It should be understood that the quantity of override awards and threshold amounts described are intended as examples and other quantities of override awards and threshold amounts (or ranges) can be employed. For example, in another non-limiting example, the aggregate award can be provided if it is less than a first threshold, a first override award can be provided if the aggregate award is between the first threshold amount and a second threshold, and a second override award can be provided if the aggregate award is between the second threshold amount and a third threshold amount, and the aggregate award can be provided if it is greater than the third threshold amount.

Figure 10:
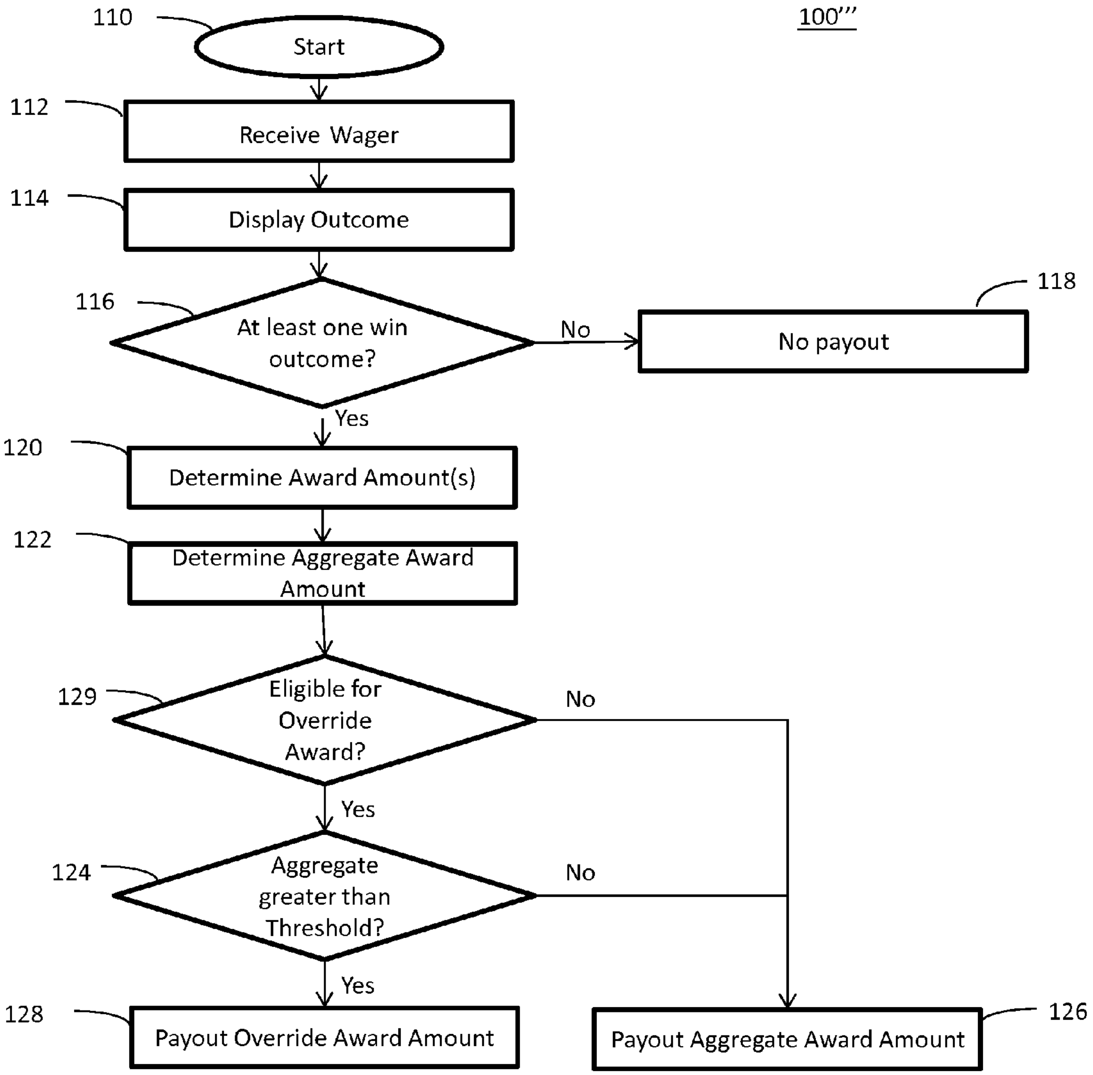
FIG. 10 is a flowchart for an exemplary algorithm that corresponds to instructions executed by a controller in accord with at least some aspects of the disclosed concepts.

According to some aspects of the present disclosure, the threshold-based override award functionality can be employed for every play of the wagering game without any determination as to whether a player is eligible to receive an override award. According to alternative aspects of the present disclosure, the threshold-based override award can be provided only if the player is determined to be eligible (e.g., via the CPU 30 and/or the external system 48) to receive the override award. For example, player eligibility to receive the override award for a play of the wagering game can be based on an amount wagered by the player for the play. In one non-limiting implementation, the player is eligible to receive an override award only if the player wagered a max bet for the play of the wagering game. As another example, player eligibility to receive the override award can be based on a player’s turnover amount over a plurality of plays of the wagering game. As yet another example, player eligibility to receive the override award can be based on a player’s status in a loyalty program with an operator of the wagering game. FIG. 10 illustrates an example flowchart for an algorithm 100'" for conducting the wagering game with the threshold-based override award based on player eligibility. As shown in FIG. 10, the algorithm 100'" is substantially similar to the algorithm 100 of FIG. 1, except the algorithm 100'" includes an additional step 129 for determining whether a player is eligible to receive an override award.

It is contemplated that, according to some aspects, the threshold-based override award can be employed in a basic wagering game, a bonus wagering game, and/or combinations thereof. FIGS. 4, 7, 8, and 10, described by way of example above, represent exemplary algorithms that correspond to at least some instructions executed by the CPU 30 in FIG. 2 to perform the above described functions associated with the disclosed concepts. It is also within the scope and spirit of the present concepts to omit steps, include additional steps, and/or modify the order of steps presented above. As one non-limiting example, steps 124A, 124B, and/or 124C can be performed in a different order than that illustrated in FIG. 8. Additionally, for example, the algorithm 100" illustrated in FIG. 8 can include an additional step to determine whether the aggregate award amount is less than the first threshold amount. As yet another example, the determination of player eligibility at step 129 can be performed after the step of determining whether the aggregate is greater than the threshold amount at step 124 in the algorithm 100''' illustrated in FIG. 10. As still another example, the exemplary algorithms of FIGS. 7-8 can include a step for determining player eligibility to receive an override award.

In some embodiments, the wagering game includes thresholds that remain constant for every wagering-game play, regardless of a player's wager. In other embodiments, the wagering game may include thresholds that vary, linearly or otherwise, based on a player's wager. For example, in a linear-variance embodiment, the first threshold may be set at 200 credits for a player wagering a single credit per play, whereas the first threshold may be set at 400 credits for a player wagering two credits per play. In a nonlinear-variance embodiment, the first threshold may be set at 200 credits for a player wagering a single credit per play, whereas the first threshold may be set at 250 credits for a player wagering two credits per play. Thus, in this nonlinear example, a payback advantage can be provided to players placing higher wagers per game. It should be noted that the above embodiments are for illustration, and various other types of linear and nonlinear threshold-variance mechanics may be utilized and understood by those skilled in the art. The present invention provides skilled artisans nearly endless mathematical flexibility in designing wagering games implementing override awards.

While in the embodiments described above, the wagering game included a slot type wagering game, it should be understood that the wagering game can additionally or alternatively include other wagering games, such as video poker, video black jack, video lottery, etc., in whole or part. Additionally, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A method of operating a gaming system including game-logic circuitry and a gaming machine, the gaming machine primarily used for playing at least one casino wagering game, the gaming machine including an electronic display device and one or more electronic input devices, the method comprising:

detecting, via at least one of the one or more electronic input devices, a physical item associated with a monetary value that establishes a credit balance;

initiating a casino wagering game in response to an input indicative of a wager covered by the credit balance;

displaying, via the electronic display device, a plurality of symbols to indicate a randomly selected outcome of the casino wagering game in a display area;

determining, via the game-logic circuitry, one or more award amounts for the randomly selected outcome, the one or more award amounts being based on the wager and the symbols of the randomly selected outcome;

determining, via the game-logic circuitry, an aggregate award amount based on the one or more award amounts;

comparing, via the game-logic circuitry, the aggregate award amount to a predetermined threshold amount, wherein the predetermined threshold amount varies from a first play to a second play of the casino wagering game;

awarding the aggregate award amount if the aggregate award amount is less than the predetermined threshold amount;

awarding an override-award amount if the aggregate award amount is greater than the predetermined threshold amount; and receiving, via at least one of the one or more electronic input devices, a cashout input that initiates a payout from the credit balance.

2. The method of claim 1, wherein the override-award amount is a maximum award amount for the wagering game.

3. The method of claim 1, further comprising:

comparing, via the game-logic circuitry, the aggregate award amount to the override-award amount; and awarding the aggregate award amount if the aggregate award amount is greater than the override-award amount, the awarding the override-award amount being in response to the aggregate award amount also being less than the override-award amount.

4. The method of claim 1, further comprising determining player eligibility to receive the override-award amount.

5. The method of claim 1, wherein the override-award amount is awarded when the aggregate award amount is greater than the override-award amount.

6. The method of claim 1, wherein the predetermined threshold amount varies based on the wager such that the predetermined threshold increases as the wager increases.

7. The method of claim 1, wherein the predetermined threshold amount increases linearly as the wager increases.

8. The method of claim 1, wherein the predetermined threshold amount varies based on a casino wagering game players status with an operator of the gaming system.

9. A gaming system comprising:

a gaming machine primarily used for playing at least one casino wagering game, the gaming machine including an electronic display device and one or more electronic input devices; and game-logic circuitry configured to:

detect, via at least one of the one or more electronic input devices, a physical item associated with a monetary value that establishes a credit balance;

initiating a casino wagering game in response to an input indicative of a wager covered by the credit balance;

display, via the electronic display device, a randomly selected outcome of a casino wagering game;

evaluate the randomly selected outcome to determine one or more award amounts;

aggregate the one or more award amounts to determine an aggregate award amount;

determine whether the aggregate award amount is greater than a predetermined threshold amount that varies from a first play to a second play of the casino wagering game;

if the aggregate award amount is determined to be greater than the predetermined threshold amount, award an override-award amount;

if the aggregate award amount is determined to be less than the predetermined threshold amount, award the aggregate award amount; and receive, via at least one of the one or more electronic input devices, a cashout input that initiates a payout from the credit balance.

10. The gaming system of claim 9, wherein the override-award amount is greater than the predetermined threshold amount.

11. The gaming system of claim 9, wherein the override-award amount is a maximum award amount for the wagering game.

12. The gaming system of claim 9, wherein the game-logic circuitry is further configured to:

determine whether the aggregate award amount is greater than the override-award amount; and award the aggregate award amount if the aggregate award amount is greater than the override-award amount, wherein the override-award amount is awarded in response to the aggregate award amount also being not greater than the override-award amount.

13. The gaming system of claim 9, wherein the game-logic circuitry is further configured to determine eligibility to receive the override-award amount.

14. The gaming system of claim 9, wherein the predetermined threshold amount varies based on the wager such that the predetermined threshold increases as the wager increases.

15. The gaming system of claim 9, wherein the predetermined threshold amount increases linearly as the wager increases.

16. The gaming system of claim 9, wherein the predetermined threshold amount varies based on a casino wagering game player's turnover amount over a plurality of plays of the casino wagering game.

17. A method of operating a gaming system, the gaming systems including game-logic circuitry and a gaming machine, the gaming machine primarily used for playing at least one casino wagering game, the gaming machine including an electronic display device and one or more electronic input devices, the method comprising:

detecting, via at least one of the one or more electronic input devices, a physical item associated with a monetary value that establishes a credit balance;

initiating a casino wagering game including a basic game and a bonus game in response to an input indicative of a wager covered by the credit balance;

displaying, via the electronic display device, a randomly selected outcome of the bonus game of the casino wagering game in a display area;

determining, via the game-logic circuitry, one or more award amounts for the randomly selected outcome, the one or more award amounts being based on the randomly selected outcome of the bonus game;

determining, via the game-logic circuitry, an aggregate award amount based on the one or more award amounts;

comparing, via the game-logic circuitry, the aggregate award amount to one or more of a plurality of predetermined threshold amounts, each of the plurality of predetermined threshold amounts being associated with a respective one of a plurality of override-award amounts;

if the aggregate award amount is not greater than at least one of the plurality of predetermined threshold amounts, awarding the aggregate amount;

if the aggregate award amount is greater than at least one of the plurality of predetermined threshold amounts, awarding the override-award amount associated with the greatest predetermined threshold amount that is less than the aggregate award amount; and receiving, via at least one of the one or more electronic input devices, a cashout input that initiates a payout from the credit balance.

18. The method of claim 17, wherein the plurality of override-award amounts includes N override-award amounts, the Nth override-award being a maximum award amount for the bonus game of the casino wagering game.

19. The method of claim 17, further comprising determining eligibility to receive any of the plurality of override-award amounts.

20. The method of claim 19, wherein the eligibility is determined based on whether the wager is a max bet.

* * * * *